Dec. 25, 1956 G. L. ALLERTON 2,775,702

REFLEX KLYSTRON OSCILLATOR

Filed July 3, 1952

INVENTOR
G. L. ALLERTON
BY W. a. Parnell
ATTORNEY

United States Patent Office 2,775,702

Patented Dec. 25, 1956

2,775,702

REFLEX KLYSTRON OSCILLATOR

George L. Allerton, Allentown, Pa., assignor to Western Electric Company, Incorporated, New York, N. Y., a corporation of New York Application July 3, 1952, Serial No. 297,077

4 Claims. (Cl. 250—36)

This invention relates to klystron oscillators and particularly to a reflex klystron sweeping oscillator.

In testing wide band microwave circuit components there has been a particular need for a sweeping oscillator to cover the operating frequency band. Heretofore, means have been devised for varying the frequency of reflex klystron oscillators by changing the tuning of the resonator cavity, by changing the repeller voltage and by a combination of these two. To applicant's knowledge, however, no means have been devised or invented for varying, at a constant rate, the resonator tuning while synchronously varying the repeller voltage whereby a very wide band of frequencies in the microwave range, is swept continuously.

It is, therefore, an object of this invention to improve the method of, and apparatus for, tuning a reflex klystron oscillator so that the frequency varies continuously back and forth over a wide band at a fixed rate.

Applicant accomplishes his object through the use of one or more electro-mechanical transducers which convert low-frequency electrical power into mechanical motion for driving tuning plungers in the external cavity resonator of a reflex klystron tube while simultaneously varying the bias of the repeller electrode with a voltage supplied from the low frequency voltage source which also actuates the transducers.

Other objects and advantages will be apparent from the following detailed discussion and description of the specific embodiment shown in the drawing in which.

Figure 1:
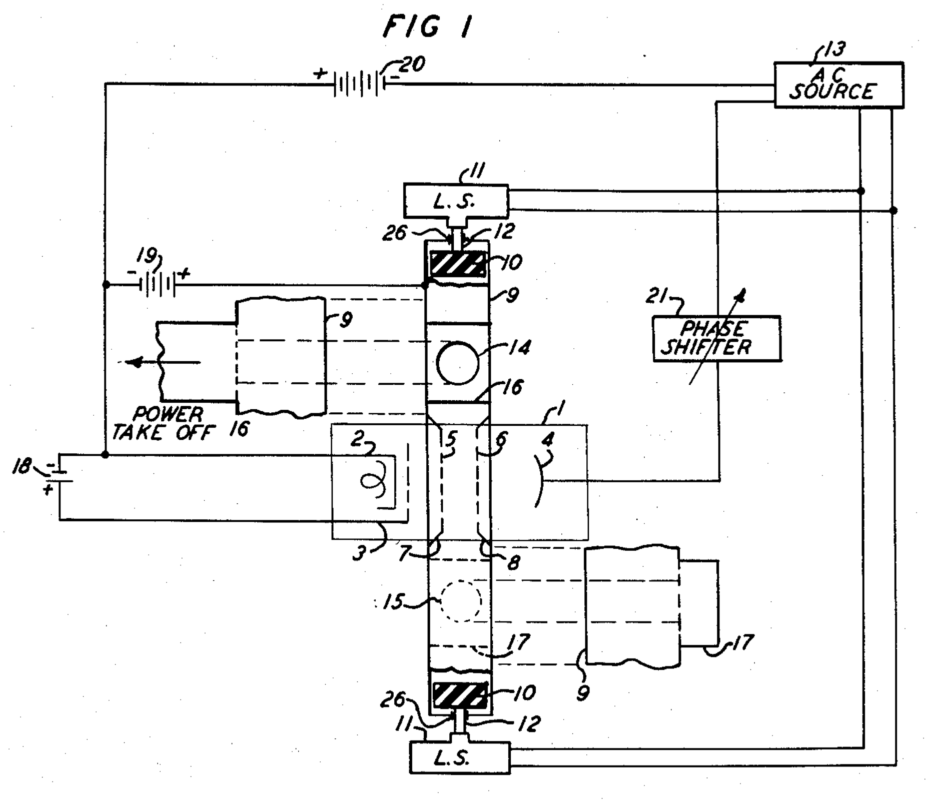
Fig. 1 is a schematic of the oscillator according to the invention.

With reference to Fig. 1 of the drawing, 1 is a reflex klystron tube of a type requiring an external cavity resonator (such as the Raytheon RK5721 or the Western Electric 770). This tube has an indirectly heated cathode 2, control grid 3, repeller 4, radio frequency grids 5 and 6 and grid rings 7 and 8 connected to the radio frequency grids 5 and 6, respectively.

An external waveguide cavity resonator 9 makes mechanical and electrical connection to the radio frequency grid rings 7 and 8 of the klystron 1 thereby connecting the cavity resonator to the radio frequency grids 5 and 6. The waveguide cavity 9 is provided with two conductive, tuning plungers 10. (The device is also operative with one plunger, however, this reduces the tuning range of the cavity.) The plungers 10 are driven by electromechanical transducers 11 having their mechanical outputs connected to the plungers through connecting members 12. A clearance is provided between the plungers and the walls of the waveguide to assure smooth, frictionless movement. Guides 26 control the motion of the plungers to maintain this clearance throughout their travel in the waveguide. Transducer units 11 are driven by a low frequency source 13 and are adjusted and synchronized so that both plungers move in toward, and away from, the klystron at the same time thereby cyclically varying the volume and therefore the tuning of the cavity. The frequency of the alternating current source 13 is determined by the sweep rate desired.

The waveguide cavity resonator 9 is provided with coupling holes 14 and 15 located about a ¼ wave length, in the guide, in front of the midband position of the plungers 10 so that substantially a uniform power output may be obtained across the band. These coupling holes 14 and 15 lead to power output waveguide 16 and a symmetrical load cavity 17 respectively and are shown in the projected views of Fig. 1. The purpose of the symmetrical load cavity 17 is to balance the output load.

The direct current bias voltages for the control grid 3, the resonator 9, and the repeller 4 are provided by the direct current sources 18, 19 and 20, respectively. The polarities of these sources are such that the resonator 9 is positive and the repeller 4 is negative with respect to the cathode 2. The control grid 3 may be either positive or negative with respect to the cathode 2 depending on the cathode current and the degree of control required.

Besides the direct current bias source 20, the repeller circuit also includes a phase shifter 21 and a low frequency voltage supply obtained from the source 13 which also provides the transducer actuating voltage. The repeller 4 is connected to the alternating current source 13, and the phase shifter 21 is adjusted so that as the plungers move in, thereby increasing the resonant frequency of the cavity, the repeller voltage rises or becomes more negative with respect to the cathode and, as the plungers move out, thereby decreasing the resonant frequency of the cavity, the repeller voltage decreases or becomes more positive with respect to the cathode. This phase shifter may be of conventional design and is included in this circuit to compensate for the phase shift between the applied voltage and the actual physical position of the plungers.

A typical oscillator according to the invention for operation in the 8480 to 9600 m.c. band, with an average power output of 30 milliwatts utilizing a Raytheon RK5721 tube, operates in the 4¾ cycle repeller mode, and the cavity, in the ¾ wave tuning mode. The cavity is constructed of small size, X-band waveguide, that is, having inside cross-sectional dimensions of 0.9 by 0.4 inch. This size of waveguide was chosen as a compromise between the plunger performance and the match between cavity and tube. A waveguide with a larger narrow dimension would result in the plunger being more effective for the same clearance gap; whereas, a waveguide with a smaller narrow dimension would result in a lower impedance and, therefore, a better match to the tube. The tuning plungers 10, supported by Bakelite connecting members 12, are made of lightweight magnesium, have a 0.015 inch clearance from the walls of the waveguide, and are placed 1$\frac{1}{16}$ inches on each side of the centerline of the oscillator; the plunger travel is adjustable and is set to approximate plus and minus $\frac{5}{32}$ inch about this position. The centers of the coupling holes 14 and 15, which have a diameter of about $\frac{19}{64}$ inch, are about a ¼ wave length in front of the midband position of the plungers 10 or about 0.563 inch from the centerline of the oscillator. The transducers 11 are electrodynamic loud speaker units having connecting members 12 attached to the sound coils.

Throughout the oscillator all inside surfaces and all contacting surfaces are either gold or silver plated for optimum conductivity and heat dissipation.

As for the electrical requirements for the oscillator, the resonator bias voltage 19 is approximately 1.2 kilovolts, the repeller bias 20, 150 volts and the control grid bias 18, about plus 5 volts with respect to the cathode 3 or whatever voltage is required for 25 milliamperes cathode current. The frequency of the loud speaker units and the repeller sweep voltage source 13 is 20 cycles per second and its alternating current sweep voltage magnitude, supplied to the repeller circuit, varies between approximately plus and minus 25 volts so that the repeller voltage never goes positive with respect to the cathode. These voltages are only approximate and must be adjusted to the particular tube used.

Figure 2:
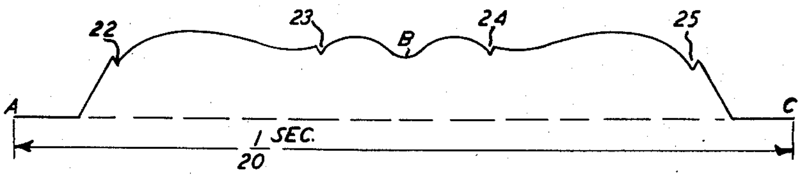
Fig. 2 is an output characteristic curve used in explaining the adjustments to the oscillator.

To make the fine adjustment on the oscillator, its output is fed to the vertical plates of an oscilloscope through a circuit including upper and lower frequency limit wavemeters, in this case set 9600 and 8680 mc. respectively. The sweep frequency of the oscilloscope is synchronized with the repeller sweep frequency. When the oscillator is properly adjusted, a trace similar to that shown in Fig. 2 should appear on the oscilloscope. This trace represents the power output of the oscillator as it sweeps back and forth each $1/20$ of a second or each sweep cycle. The points A, B and C designate the start, the midpoint where the cavity plungers reverse their direction and the end of the cycle. Properly adjusted, the second half of the cycle, that is from B to C should be the reverse of the first half A to B. From A to B the frequency is increasing and from B to C, the frequency is decreasing. The pips 22 and 25 are due to the low frequency limit wavemeter and indicate 8680 mc. and the pips 23 and 24 are due to the high frequency limit wavemeter and indicate 9600 mc. If the initial trace is not very flat, the repeller sweep phase and repeller sweep voltage amplitude are to be adjusted along with the repeller direct current bias and the resonator bias to give as flat an output characteristic as possible. If only one pair of pips (i. e. 22 and 25 or 23 and 24) appear on the trace, indicating that the resonator is not properly tuned, then the travel of the plungers 10 must be adjusted until both appear.

Although the invention has been described with particular reference to a particular type of reflex klystron tube, it is, of course, not limited to such use but is generally applicable to any reflex klystron tube oscillator having a tunable cavity resonator.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A reflex klystron oscillator having an external tuning cavity and means for cyclically varying the frequency of the oscillator comprising a plunger in the cavity, a source of low frequency electrical power, an electromechanical vibratory device connected to the source for vibrating the plunger at the frequency of the source, circuit connections between the cathode and repeller electrodes of the klystron, means for applying a fixed potential between the cathode and repeller and electrical connections from the source to the repeller-cathode circuit to vary the repeller voltage over a predetermined range at the frequency of the source so that at any instant the potential of the repeller and the tuning of the cavity both correspond to substantially the same oscillation frequency of the klystron.

2. A reflex klystron oscillator having an external waveguide tuning cavity extending in opposite directions from the klystron and means for cyclically varying the frequency of the oscillator comprising a plunger in each of the two ends of the cavity, a source of low frequency electrical power and an electro-mechanical vibratory device connected to the source for vibrating each of the plungers at the frequency of the source, means for applying a fixed potential between the cathode and repeller of the klystron, and electrical connections from the source to the repeller to vary the repeller voltage over a predetermined range at the frequency of the source so that at any instant the potential of the repeller and the tuning of the cavity both correspond to substantially the same oscillation frequency of the klystron.

3. A reflex klystron oscillator having an external tuning cavity and means for cyclically varying the frequency of the oscillator comprising a plunger in the cavity, a source of low frequency electrical power, an electromagnetic control unit for driving the plunger connected to the source vibrating at the frequency of the source, a repeller circuit including means for applying a fixed potential between the cathode and repeller of the klystron, electrical connections from the source to the repeller circuit to vary the repeller voltage over a predetermined range at the frequency of the source and a passive electrical network for controlling the phase relationship between the instantaneous repeller voltage and the plunger position as required for the particular frequency of the low frequency source so that at any instant the potential of the repeller and the tuning of the cavity both correspond to substantially the same oscillating frequency of the klystron.

4. A reflex klystron oscillator having an external tuning cavity and means for cyclically varying the frequency of the oscillator comprising a plunger in the cavity, a source of low frequency electrical power variable over the audio range, an electro-mechanical vibratory device connected to the source for vibrating the plunger at the frequency of the source, circuit connections between the cathode and repeller electrodes of the klystron, means for applying a fixed potential between the cathode and repeller, electrical connections from the source to the repeller-cathode circuit to vary the repeller voltage over a predetermined range at the frequency of the source so that at any instant the potential of the repeller and the tuning of the cavity both correspond to substantially the same oscillator frequency of the klystron and a variable passive electrical phase shift network in the repeller-cathode circuit for varying the phase relationship between the instantaneous repeller voltage and the plunger position as required for the particular frequency of the audio frequency source.

References Cited in the file of this patent

UNITED STATES PATENTS

| | | |
|---|---|---|
| 2,419,121 | Clifford | Apr. 15, 1947 |
| 2,434,294 | Ginzton | Jan. 13, 1948 |
| 2,496,535 | Hoglund et al. | Feb. 7, 1950 |
| 2,566,606 | Farnham | Sept. 4, 1951 |
| 2,640,964 | Freedman et al. | June 2, 1953 |
| 2,682,623 | Woodyard et al. | June 29, 1954 |

OTHER REFERENCES

"Microwave Sweep Generator," Electronics, November 1950, pages 101–103.